US006385061B1

(12) United States Patent
Turchi et al.

(10) Patent No.: US 6,385,061 B1
(45) Date of Patent: May 7, 2002

(54) SWITCHED MODE POWER SUPPLY WITH PROGRAMMABLE SKIPPING MODE

(75) Inventors: Joel Turchi, Toulouse (FR); Frantisek Sukup, Roznov Pod Radhostem (CZ)

(73) Assignee: Semiconductor Components Industries LLC, Pheonix, AZ (US)

( * ) Notice: Subject to any disclaimer, the term of this patent is extended or adjusted under 35 U.S.C. 154(b) by 0 days.

(21) Appl. No.: 09/855,202

(22) Filed: Feb. 12, 2001

(30) Foreign Application Priority Data

Feb. 11, 2000 (EP) .............................. 00400408

(51) Int. Cl.$^7$ ..................... H02M 3/335; H02M 7/68
(52) U.S. Cl. ................... 363/21.15; 363/21.12; 363/21.17; 363/97; 323/902
(58) Field of Search .................. 363/21.01, 21.12, 363/21.15, 21.17, 95, 97, 131; 323/902

(56) References Cited

U.S. PATENT DOCUMENTS

| | | | |
|---|---|---|---|
| 4,323,961 A | * 4/1982 | Josephson | 363/56 |
| 4,623,960 A | * 11/1986 | Eng | 363/21.15 |
| 4,864,480 A | 9/1989 | Melcher | 363/21 |
| 5,751,565 A | 5/1998 | Faulk | 363/41 |
| 5,973,945 A | 10/1999 | Balakrishnan et al. | 363/80 |
| 5,995,384 A | * 11/1999 | Majid et al. | 363/21.15 |
| 6,137,696 A | * 10/2000 | Hall et al. | 363/97 |

FOREIGN PATENT DOCUMENTS

WO  9422208  9/1994  .......... H02M/3/335

* cited by examiner

Primary Examiner—Bao Q. Vu

(57) ABSTRACT

A method and a power conversion apparatus having a substantially direct current input voltage, an output transformer having a primary inductor and at least a secondary winding, and a transistor for controlling the transfer of energy from the primary inductor to the secondary winding and coupled to a controller for switching the transistor on and off at a predetermined rate. A sensor for sensing the power required at the output of the conversion apparatus and for generating a voltage representative thereof is provided, as is provided a sensor for sensing the peak current in the primary inductor and for developing a voltage representative thereof. The controller contains a circuit for inhibiting selected on-cycles of the transistor when the power demand from the output of the conversion apparatus is less than the desired peak current in the primary inductor, the circuit comprising a comparator, a current source for developing a biasing voltage representative of the desired peak current in the primary inductor across a resistor external to the controller during the time when the transistor is switched off, means for receiving the voltage representative of the power required, comparing the biasing voltage to the voltage representative of the power required at the output, and having the output of the comparator coupled to the gate of the transistor for causing the transistor to skip on-cycles when the power demand from the output is below that power the biasing voltage is representative of.

9 Claims, 3 Drawing Sheets

SWITCHED MODE POWER SUPPLY WITH PROGRAMMABLE SKIPPING MODE

FIELD OF THE INVENTION

This invention relates to a method and apparatus for implementing a skipping mode in power sources, and, more particularly, implementing a skipping mode which is programmable.

BACKGROUND OF THE INVENTION

Switched mode power supplies (SMPS) are used in many applications in consumer and other products. Low power SMPS, for example are used in television receivers, personal computers, facsimile machines, video cassette recorders, and computer monitors. These SMPS are typically based on flyback transformer technology, but can utilize other technologies as well.

Because of the heavy use of these power supplies in high volume consumer applications, standby or idle power consumption is of great importance, since the devices are operated in idle mode much of the time. Additionally industry recommendations of the permissible idle power consumption levels of such apparatus are becoming increasingly stringent. Furthermore, again because of the high volume applications for these power supplies, low cost and compact construction are also significant factors.

In general, power supply efficiency is extremely low at low power levels. The use of a skipping mode allows the power supply to continuously operate at a high power level. This is accomplished by transferring higher power packets from time to time so that the average supplied power equals the load demand. The higher the power of the energy packets, the higher the efficiency.

Unfortunately, the so-called "burst" mode operation has one major drawback: the risk of audible noise in the apparatus being powered. The most effective way to reduce this audible noise is to limit the peak current in this mode. The packet energy level must then be limited. Thus it is useful to have the capability of adjusting the skipping threshold, that is, the power demand threshold at which a new power packet is to be supplied to the load, as this allows obtaining the best compromise between low standby loss and acceptable noise in any application, since different applications have different tolerances for noise from the power supply.

SMPS generally work in either voltage mode or in current mode. The regulation of the output voltage and skipping function is controlled by an integrated circuit controller which controls the action of a power transistor in transferring energy form the primary inductor of a transformer to the output. In voltage mode, an error amplifier output controls a power switch on-time. In this case current cycles are skipped when the demanded on-time is lower than a certain level. The peak current varies with respect to the input voltage as follows:

$$Ipk = Vin * ton / Lp$$

where: Ipk is the peak current

Vin is the rectified input voltage

Ton is the on-time

Lp is the transformer primary inductance

Therefore the peak current is proportional to the input voltage. If the skipping mode is implemented in a voltage mode controller, the peak current corresponding to the skipping threshold is proportional to the rectified input voltage.

In current mode, the error amplifier directly controls the peak current. In this case, current cycles are skipped when the peak current required by the error amplifier is lower than a chosen level. Consequently, the skipping threshold determines the skipping peak current. The current mode is, then, the operation mode that best fits the skipping mode technique, but the invention can also be used with a voltage mode circuit.

In both cases it is important to be able to program the skipping threshold. This feature is easy to perform using an additional pin of the controller dedicated to this function. Unfortunately, the pin count in integrated circuits, particularly where cost or size is a consideration, is very critical and no pin may be available for such a function.

It would be desirable, then, to be able to combine the skipping peak current adjustment with the current sense function such that both functions may use the same input pin on the integrated circuit.

DESCRIPTION OF THE PREFERRED EMBODIMENT

Figure 1:
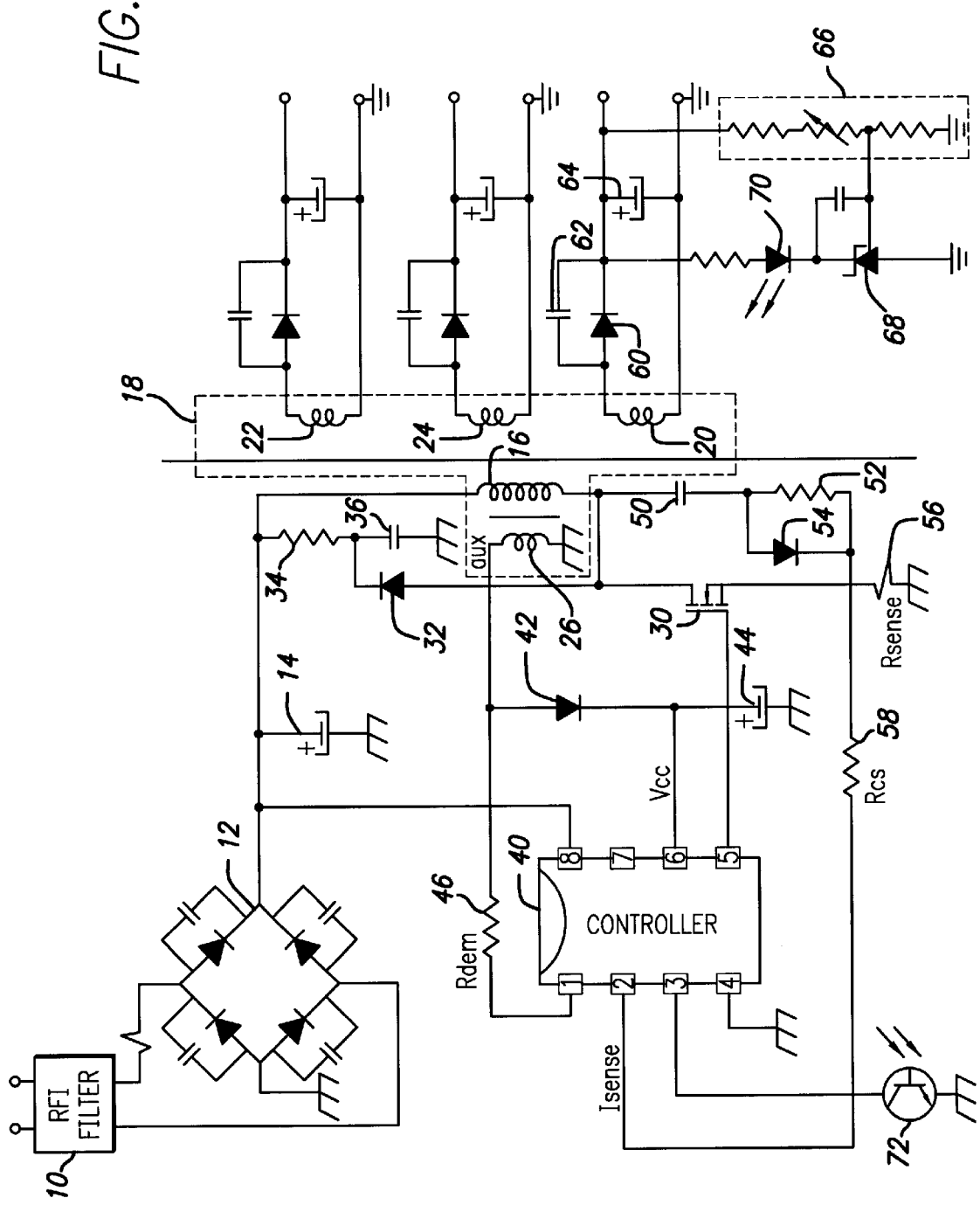
FIG. 1 is a schematic diagram of a switched mode power supply.

FIG. 1 is a schematic diagram of a flyback switched mode power supply having the capability of operating in the skipping mode. While a flyback switched mode power supply has been chosen to exemplify the invention, the invention itself can be used in other applications as well, such as other types of switched mode power supplies, DC to DC converters or the like. Such a power supply may have an input voltage from the mains applied to an input RFI filter 10, the output of which is applied across a conventional diode bridge rectifier 12. The diodes may have filtering capacitors associated with them. A bulk capacitor 14 filters the rectified output of the bridge rectifier 12 that is applied to a primary inductor 16 of a power transformer 18. The power transformer 18 has additionally a secondary winding 20, which is a voltage-regulated secondary winding and two additional secondary windings 22 and 24 which are not directly regulated, but are indirectly regulated as a result of the regulation of the peak current through primary inductor 16 of transformer 18. One additional winding, designated as Aux, or auxiliary 26, is provided.

The additional secondary windings 22 and 24 may be used to power different circuits of the load apparatus. For example, if the load apparatus is a television receiver, the directly regulated output from secondary winding 20 may be used to provide power to the CRT while one of the additional outputs may power the audio circuitry and another the picture quality circuitry in the receiver.

A power transistor 30, which may be a power switch MOSFET is coupled to a diode 32, which, in turn, is connected to the junction of a resistor 34 and capacitor 36. The resistor 34 is connected to the rectified output of the diode bridge 12. The diode 32, resistor 34 and capacitor 36 form a clamping circuit to protect the transistor 30 from excessive voltages. The gate of the power transistor 30 is controlled by the output of a switched mode power supply (SMPS) controller 40. Power for the controller 40 is supplied from the auxiliary winding 26 through diode 42, which passes only positive voltage to the terminal Vcc of the controller and to charge capacitor 44. The output of the auxiliary winding 26 is also applied, through resistor 46, designated Rdem, to a pin of the controller 40, the function of which will be discussed later.

The side of the primary inductor not coupled to the rectified input voltage is coupled to a snubber circuit comprising a capacitor 50, a resistor 52 and a diode 54. The snubber circuit, the purpose of which is to reduce the switching stresses, is shown for completeness but is not necessarily used, particularly in low power applications. The snubber circuit is, in turn, coupled through a resistor Rsense 56 to ground. Resistor Rsense 56 is also coupled through a resistor Rcs 58 to the Isense pin of the controller 40.

The positive terminal of regulated secondary winding 20 of power transformer 16, which provides the main source of energy for the load, is half-wave rectified by diode 60 and capacitor 62, and filtered by capacitor 64. The positive terminal is also coupled to a voltage divider 66 (one resistor of which may be variable for purposes of initially setting the output regulation level) that senses the output voltage of the power supply. The tap of the voltage divider is applied as an input to a programmable reference 68 that functions as a comparator. From voltage divider 66 a portion of the output voltage is applied to the input of programmable reference 68 so that the programmable reference draws a current representative of the difference between the actual output voltage and the desired output voltage. A suitable programmable reference may be a Part No. TL 431, manufactured by ON Semiconductor, Inc. Other comparator devices, operational amplifiers, or techniques could be used, of course, the cited programmable reference being merely exemplary.

The current through programmable reference 68 is applied to an opto coupler emitter diode 70 that is part of an optical coupler used to provide isolation between the output and input circuits of the power supply. The other part of the optical coupler, the receiver 72, which receives a copy of the current in the programmable reference, is coupled to the feedback pin of the controller 40. The feedback pin therefore receives a signal representative of the difference between the output voltage and the desired output voltage. While a secondary sensing application using an opto couple is shown, other regulation and coupling means could be used, for example, primary sensing regulation.

In operation, when an input voltage from the mains is applied to the filter 10 and bridge rectifier 12, a rectified input voltage is applied to the primary inductor 16 of transformer 18. At the same time a rectified voltage from the diode bridge is applied to pin 8 of the integrated circuit controller 40. This voltage is connected internally of the controller 40 to pin 6 of the controller through a current generator circuit to provide a charge on capacitor 44. When the voltage on capacitor 44 exceeds a predetermined value, controller 40 becomes active, turning on and off the power transistor 30. When transistor 30 begins operating, current begins to flow in the primary inductor 16, so current then can be supplied by auxiliary winding 26 of the power transformer 18 through diode 42. If Vcc drops below a second threshold (lower than the first predetermined level) the internal current source will again begin to supply current to capacitor 44.

The controller 40 contains an oscillator that determines the nominal switching rate of transistor 30 which may be, for example, 65 kHz. During the approximately 15 microsecond period which corresponds to a 65 kHz switching frequency, the power switch 30 must be turned on and then turned off. In current mode, the power switch 30 is turned on when a clock signal is generated (from the oscillator) and it is turned off as soon as the primary inductor current exceeds a predetermined level which will be explained in more detail later. In voltage mode, the on-time of the transistor 30 is controlled rather than the peak current. So after the clock has produced the power switch turn on signal, the power switch turns off when the desired on-time has been reached. In skipping mode, as will be discussed in detail, the power switch can be kept off for several oscillator periods.

The primary inductor current rises linearly during the power switch on-time. During the off-time in discontinuous mode, i.e., when no on-time is allowed as long as there is some current flowing through the transformer, the stored energy ($½*L*Ipk^2$) is transferred to the output (where L is the inductance of the primary inductor 16 and Ipk is the primary inductor peak current obtained at the end of the on-time). In continuous mode the stored energy is represented by ($½*L*Ipk^2-Ipko^2$) where Ipko is the initial current value at the beginning of the on-time. The voltage divider 66 provides the programmable reference 68 with a portion of the output voltage so that programmable reference 68 draws a current representing the difference between the desired output voltage level and the actual voltage value. The current generated by the comparator 68 is coupled by the optical coupler 70, 72 to pin 3, the feedback pin of the controller 40. This feedback path sets the internal current level setting circuit in the regulation block of the controller 40, which determines the peak current level needed to supply the power required by the load.

Also, the current through the primary inductor 16 of transformer 18 is sensed by Rsense 56 and a voltage representative of the primary current is applied through resistor Rcs 58 to pin 2, Isense, of controller 40. Internally of controller 40, as will be explained later, the voltage applied to pin 2 is compared to the regulation block output (in current mode) so that the power MOSFET 30 is turned off when the sensed voltage exceeds this threshold. In this manner, the peak current and then the transferred power is tuned to provide the appropriate output voltage.

For completeness of description, through resistor Rdem 46 the voltage of aux 26 is applied to pin 1 of controller 40 for demagnetization protection. A circuit within controller 40, which forms no part of the instant invention, uses the applied voltage to determine when the current through transformer 18 passes through zero, and inhibits the turn-on of power transistor 30 until a zero current is detected. Current increases linearly in the transformer when transistor 30 is turned on. When the transistor turns on and the power switches off, the current through the transformer 18 decreases linearly from a peak to zero. During this time there is positive voltage across Aux. As the current passes through zero, the voltage across Aux passes through zero and is sensed by the circuit at pin 1. Inhibiting the turn-on of transistor 30 until the transformer current is zero ensures discontinuous operation of the transistor 30 to avoid overstress of the transistor caused by operation in a continuous mode.

Figure 2:
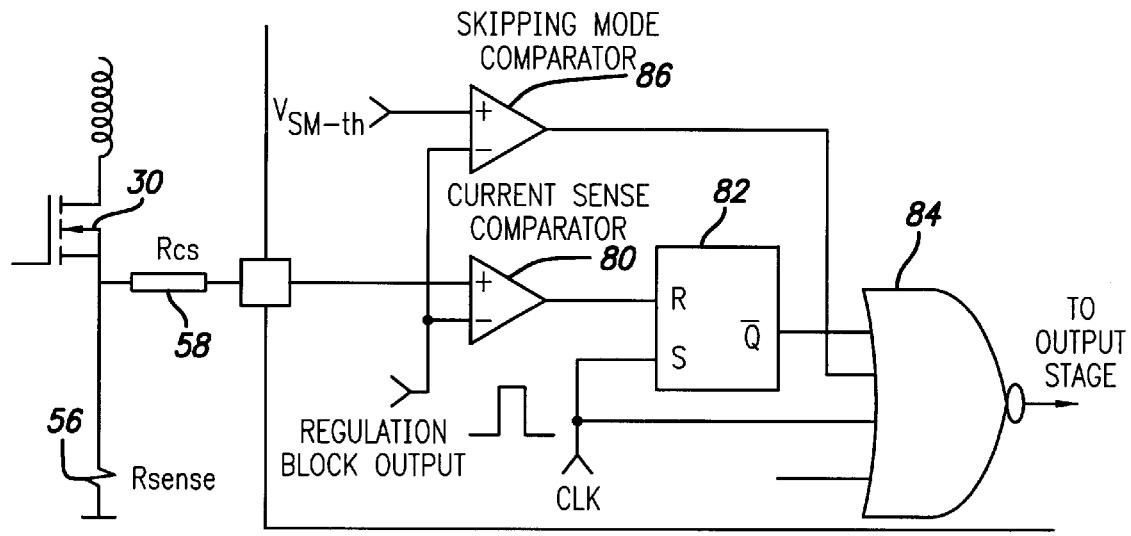
FIG. 2 is a schematic diagram of a portion of the controller of FIG. 1 showing the control mechanism for the switching transistor operating in current mode.

Skipping mode is accomplished by holding transistor 30 off when a power packet is to be skipped. FIG. 2 shows a circuit for driving transistor 30 to turn on or remain off depending upon whether the load requires more power. The resistors Rsense 56 and Rcs 58 as well as transistor 30 are shown. In this as in the remaining figures, comparable circuit elements are assigned the same numbers. Rcs is connected to the Isense pin of the controller 40. The remainder of the circuitry shown in FIG. 2 and the other figures is circuitry that is within the integrated circuit controller 40. Coupled to the input pin is a current sense comparator 80. Also connected as an input to comparator 30 is the output of the regulation block, also internal to the controller 40. The Regulation Block Output represents the peak current necessary to supply the needed power to the output. As previously noted, the voltage divider 66 provides a portion of the output voltage to the comparator 68. If the voltage is above a predetermined threshold, a current is generated by the comparator 68 that is coupled by the optical coupler 70, 72 to pin 3, the feedback pin of the controller 40. This feedback sets the internal current level setting circuit in the regulation block of the controller 40, which determines the peak current level needed to supply the power required by the load. The resistor Rsense measures the current in the primary inductor 16 of transformer 18 that is converted to a representative voltage applied to Isense through resistor Rcs. This voltage is compared to the output of the regulation block in comparator 80. If the voltage at Rsense exceeds the regulation block output a latch 82 is reset and NOR gate 84 is switched off. NOR gate 84 drives an output circuit that adjusts the voltage and current of the gate output to drive the gate of transistor 30. When the output of NOR gate 84 is off, or low, transistor 30 is turned off. When transistor 30 is on, current flows through the primary of transformer 18. When transistor 30 is off, the power is transferred to the output. A clock signal of approximately 65 kHz applied to the latch 82, as previously noted, attempts to set the latch 84 and turn the transistor on. The latch has a stronger reset than set, so if a reset signal and a clock signal are received, the comparator output resets to low. When the sensed current exceeds the required level, the latch 82 is reset and the output is turned off.

The regulation block output controls the peak current in the primary inductor 16 of the transformer 18. The output of the regulation block is also compared, in comparator 86, to a signal Vsm, which is an internally generated signal of approximately 0.3 volts. The regulation block output signal can vary between 0 and 1 volt. (These voltages given are representative only, for a particular circuit. Other circuits may require different values.) When Isense exceeds the required level, the latch 82 is reset and the output is turned off. If the regulation block output is lower than Vsm, the output of comparator 86 is high, causing the output of NOR gate 84 to go to zero and turn transistor 30 off. As the output decreases, the regulation block output increases. If the regulation block output is higher than Vsm, the comparator 86 output would be low and would have no effect on the NOR gate 84 output. If the regulation block output is lower than Vsm, the output of comparator 86 is high and the output of NOR gate 84 is forced to zero and the power switch is off. The skipping mode comparator 86 is stronger than the current sense comparator 80, so if the output of skipping mode comparator 86 is high, the output of NOR gate 84 will be low, keeping transistor 30 turned off even if the output of comparator 80 is low and latch 82 is reset.

In standby mode the power to be transferred is low and the regulation block requires only a small peak current (directly in current mode, through the forced on-time in voltage mode). In normal mode (i.e., not in skipping mode), the system will continue to operate at high frequency to supply a small current. This is a highly inefficient mode of operation since each switching operation results in losses (power switch switching losses, charge and discharge of the snubber circuit and parasitic capacitors, etc.). Skipping mode allows higher current packets of energy to be transmitted at less than the nominal switching rate of the transistor 30 by skipping switching cycles when less power needs to be transferred. Unfortunately, in the circuit of FIG. 2 Vsm, which is a reference voltage which in part determines the skipping threshold, is generated on-chip and is not adjustable to allow different skipping thresholds which may be optimized for different applications.

Figure 3:
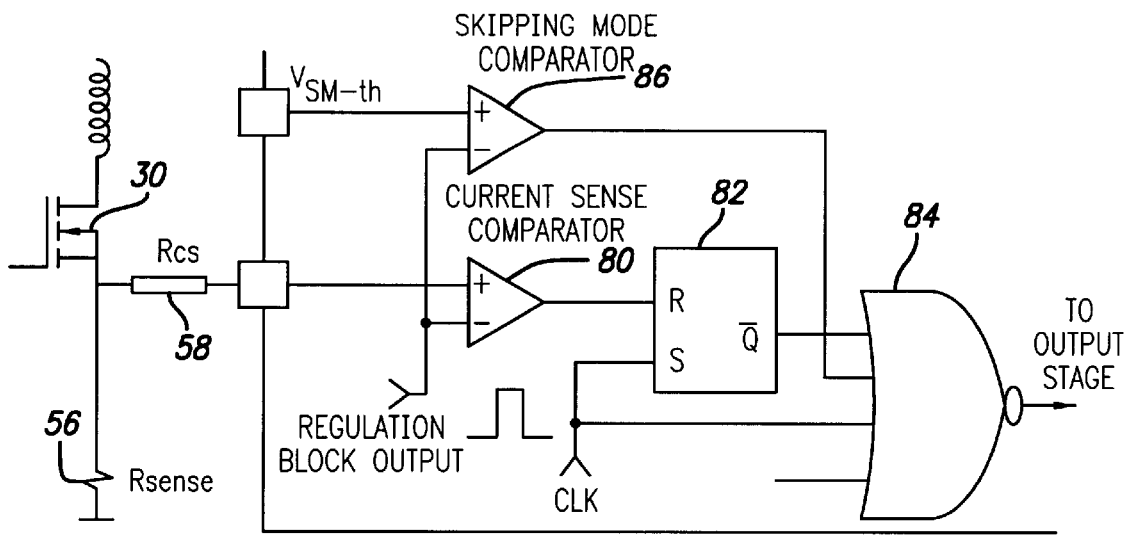
FIG. 3 is a schematic diagram of a portion of the controller of FIG. 1 showing one solution to programming the skipping mode of the power supply operating in current mode.

FIG. 3 shows an alternative embodiment of the circuit of FIG. 2. The circuit and operation are identical to that of FIG. 2 except that Vsm is generated off-chip and can therefore be adjusted. This requires an extra pin on the integrated circuit to be dedicated to this function, however, and is therefore not an optimal solution.

Figure 4:
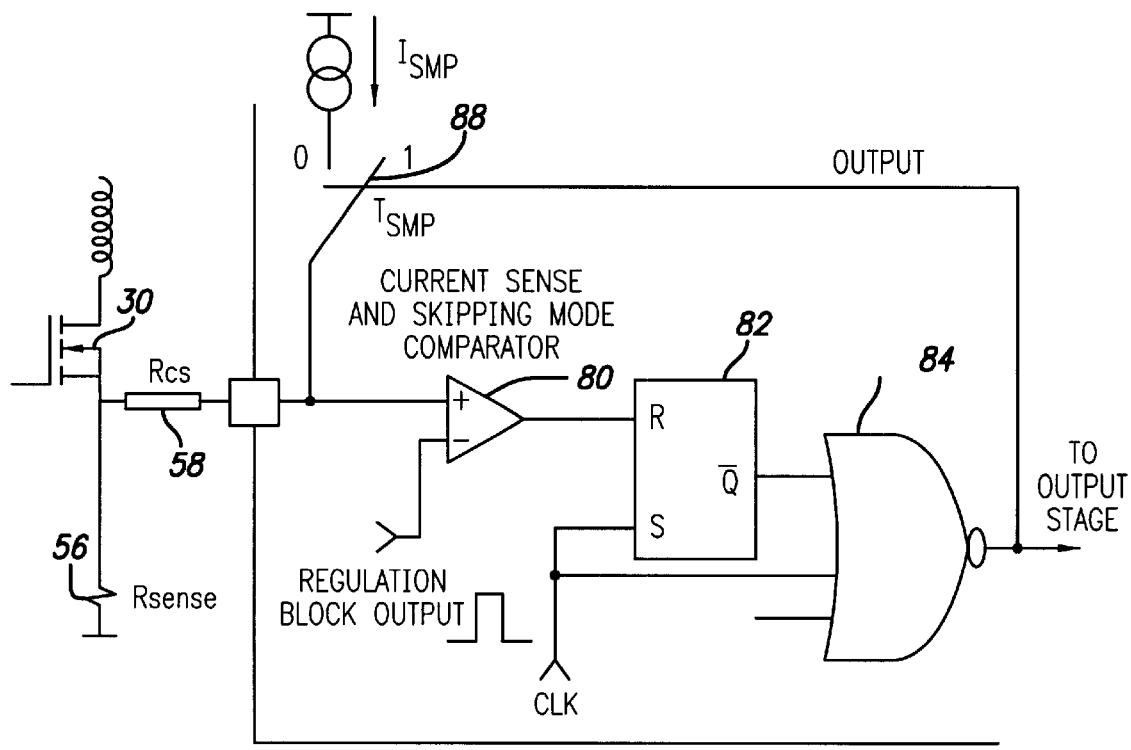
FIG. 4 is a schematic diagram of a portion of the controller of FIG. 1 showing a preferred embodiment of the instant invention for a power supply operating in current mode.

FIG. 4 is a schematic diagram of a portion of the controller of FIG. 1 showing a preferred embodiment of the instant invention for a power supply operating in current mode. In this circuit, the voltage Vsm is generated across resistor Rcs 58, that is, the size of resistor 58 is chosen to bias the Isense input such as to set the threshold of the comparator according to the skipping peak current desired for the particular application. This selection of the size of resistor Rcs allows the skipping threshold to be programmed.

When the controller output is low (i.e., the transistor 30 is off) a current source Ismp through a switch 88 injects a current through the current sense pin Isense. This current flows through the external resistor Rcs 58 and the sense resistor Rsense 56. The voltage that is then produced on the pin Isense is used as the skipping peak current threshold and in essence substitutes for the Vsm voltage of FIGS. 2 and 3. In effect, this voltage is compared to the output of the regulation block output so that the output of comparator 80 is high if the regulation block output is lower than this threshold. Consequently the latch 82 is reset and, if reset is stronger than set, the latch output cannot be turned on by the clock signal. As a result, no turn on of transistor 30 is possible until the regulation block output exceeds the skipping peak current threshold. Thus the skipping mode threshold is approximately (Rsense+Rcs)*Ismp. In practice, Rsense 56 is in the range of one ohm and Rcs 58 is in the range of 1000 ohms, so Rsense can be neglected compared to Rcs and a good skipping mode threshold approximation is Vsm=Rcs*Ismp. When the regulation block output exceeds the threshold, the output of comparator 80 goes low, the next clock signal causes the output of NOR gate 84 to go high, turning on transistor 30. As the output of NOR gate 84 goes high, the current Ismp is no longer applied across resistor Rcs. At this point the Isense voltage appears at the input of comparator to be compared to the regulation block output voltage as in the previous circuits. In this way one comparator can perform the functions of the two comparators of FIGS. 2 and 3, and no additional pin is necessary to allow programmability of the skipping threshold.

Figure 5:
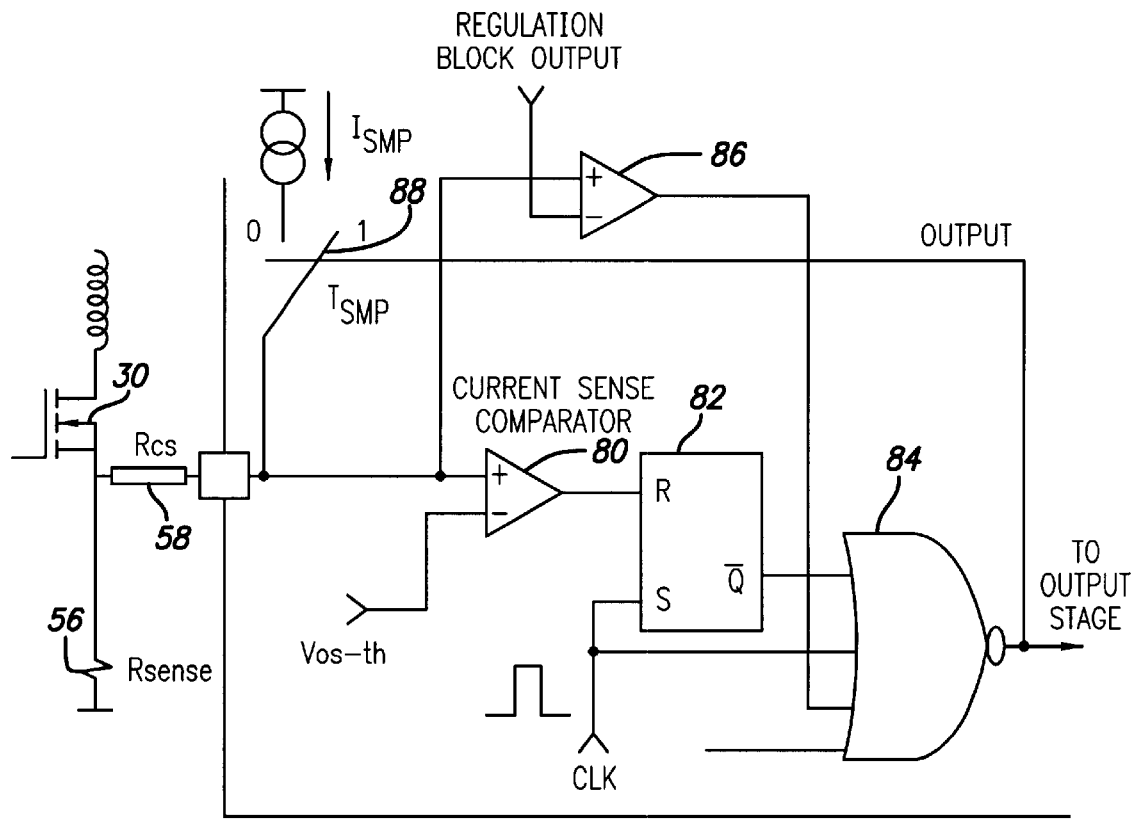
FIG. 5 is a schematic diagram of a portion of the controller of FIG. 1 showing a preferred embodiment of the instant invention for a power supply operating in voltage mode.

FIG. 5 is a schematic diagram of a portion of the controller of FIG. 1 showing a preferred embodiment of the instant invention for a power supply operating in voltage mode. In current mode, the controller 40 controls the peak power current in the primary of power transformer 18. In voltage mode the controller 40 controls the power switch on-time. In this embodiment as in that of FIG. 4, the current sense pin Isense offset is utilized to build the skipping mode threshold as in the circuit of FIG. 4. So switch 88 is closed when the output of the comparator 84 is low and a threshold current is established across resistors Rcs 58 and Rsense 56. The voltage produced is applied to comparator 86 and compared to the regulation block output. In this case a separate comparator must be used. The regulation block output controls the on-time of transistor 30. When the current sense pin voltage exceeds the regulation block output the output of comparator 86 goes high, turning off the NOR gate output 84 and turning off transistor 30. The power transfer being interrupted, the output voltages decrease and the regulation block output rises. When the regulation block output exceeds the voltage of the Isense offset, the output of comparator 86 goes low and power transfer is allowed again. The function of current sense comparator 80 in this circuit is primarily for protection.

FIG. 4 and FIG. 5 shows a circuit and a method for implementing a skipping mode in, respectively, current mode and voltage mode switched mode power supplies. While the exemplary environment in which these circuits were described is a flyback SMPS, a technique of implementing a programmable skipping mode could be easily adapted to other types of SMPS or to other voltage conversion devices such as DC to DC converters. In each of these FIGS., likewise, the circuits allow implementation of the programmable skipping mode without requiring an additional input pin to the controller.

What is claimed is:

1. In a power conversion apparatus having a substantially direct current input voltage, an output transformer having a primary inductor and at least a secondary winding, and a transistor for controlling the transfer of energy from the primary inductor to the secondary winding and coupled to a controller for switching the transistor on and off at a predetermined rate, a sensor for sensing the power required at the output of the conversion apparatus and for generating a voltage representative thereof, a sensor for sensing the peak current in the primary inductor and for developing a voltage representative thereof, the controller containing a circuit for inhibiting selected on-cycles of the transistor, the circuit comprising:

a comparator, a current source for developing a biasing voltage representative of the desired peak current in the primary inductor across a resistor external to the controller during the time when the transistor is switched off, means for receiving the voltage representative of the power required and for applying the voltage representative of the power required to the comparator, means for applying the biasing voltage to the comparator for comparing the biasing voltage to the voltage representative of the power required at the output, the output of the comparator coupled to the gate of the transistor for causing the transistor to skip on-cycles when the power required at the output is below the power the biasing voltage is representative of.

2. In a switched mode power supply having a rectifier for rectifying an AC input voltage to produce a rectified in put voltage, an output transformer having a primary inductor and at least a secondary winding, and a transistor for controlling the transfer of energy from the primary inductor to the secondary winding and coupled to a controller for switching the transistor on and off at a predetermined rate, a sensor for sensing the power required at the output of the power supply and for generating a voltage representative thereof, a sensor for sensing the peak current in the primary inductor and for developing a voltage representative thereof, the controller containing a circuit for inhibiting selected on-cycles of the transistor, the circuit comprising:

a comparator, a current source for developing a biasing voltage representative of the desired peak current in the primary inductor across a resistor external to the controller during the time when the transistor is switched off, means for receiving the voltage representative of the power required and for applying the voltage representative of the power required to the comparator, means for applying the biasing voltage to the comparator for comparing the biasing voltage to the voltage representative of the power required at the output, the output of the comparator coupled to the gate of the transistor for causing the transistor to skip on-cycles when the power required at the output is below the power the biasing voltage is representative of.

3. A circuit as set forth in claim 2 further comprising:

means for receiving the voltage representative of the peak current during the time when the transistor is switched on and applying the voltage representative of the peak current to the comparator, and the comparator comparing the voltage representative of the power required at the output to the voltage representative of the peak current to turn off the transistor when the desired peak current through the primary inductor has been reached.

4. A circuit as set forth in claim 3 wherein the means for receiving the voltage representative of the peak current and the means for receiving the biasing voltage are a common input to the controller.

5. A circuit as set forth in claim 2 wherein the output of the comparator is coupled to a logic gate, and the output of the logic gate is coupled to the gate of the transistor, and wherein the output of the logic gate controls the time of application of the current source to the external resistor.

6. In a power conversion apparatus having a substantially direct current input voltage, an output transformer having a primary inductor and at least a secondary winding, and a transistor for controlling the transfer of energy from the primary inductor to the secondary winding and coupled to a controller for switching the transistor on and off at a predetermined rate, a sensor for sensing the power required at the output of the conversion apparatus and for generating a voltage representative thereof, a sensor for sensing the peak current in the primary inductor and for developing a voltage representative thereof, a method for inhibiting selected on-cycles of the transistor, the method comprising:

providing a current source for developing a biasing voltage representative of the desired peak current in the primary inductor across a resistor external to the controller during the time when the transistor is switched off, receiving the voltage representative of the power required, comparing the voltage representative of the power required to the biasing voltage, using the comparison coupled for causing the transistor to skip on-cycles when the power required at the output is below the power the biasing voltage is representative of.

7. A method as set forth in claim 6 further comprising:

receiving the voltage representative of the peak current during the time when the transistor is switched on, and comparing the voltage representative of the power required at the output to the voltage representative of the peak current to turn off the transistor when the desired peak current through the primary inductor has been reached.

8. A method as set forth in claim 7 wherein the voltage representative of the peak current and the biasing voltage are provided on a common input to the controller.

9. A method as set forth in claim 8 wherein the comparison is used to control the switching of the transistor.

* * * * *